United States Patent
Li et al.

(10) Patent No.: US 9,050,871 B2
(45) Date of Patent: Jun. 9, 2015

(54) TEMPERATURE COMPENSATION METHOD FOR AN AIR SUSPENSION AFTER ENGINE SHUT-OFF

(75) Inventors: Yunjun Li, West Bloomfield, MI (US); John X. Cui, Rochester Hills, MI (US); Steven A. Opiteck, South Lyon, MI (US); Jonathan Darab, West Bloomfield, MI (US); Nikolai K. Moshchuk, Grosse Pointe, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 772 days.

(21) Appl. No.: 12/580,281

(22) Filed: Oct. 16, 2009

(65) Prior Publication Data

US 2011/0093166 A1    Apr. 21, 2011

(51) Int. Cl.
| G06F 17/00 | (2006.01) |
| B60G 17/019 | (2006.01) |
| B60G 17/052 | (2006.01) |

(52) U.S. Cl.
CPC ............ B60G 17/019 (2013.01); B60G 17/052 (2013.01); *B60G 2400/842* (2013.01); *B60G 2500/30* (2013.01)

(58) Field of Classification Search
USPC .............. 701/36, 37, 49, 29.1, 31.9, 32.1, 50, 701/30.5, 30.9, 32.7, 32.8, 33.1; 340/429, 340/430, 438, 440, 442, 443, 449
See application file for complete search history.

(56) References Cited

U.S. PATENT DOCUMENTS

| 4,829,436 A | 5/1989 | Kowalik et al. |
| 5,465,209 A | 11/1995 | Sammut et al. |
| 5,876,526 A | 3/1999 | Hamade et al. |
| 6,698,778 B2 | 3/2004 | Roemer et al. |
| 7,331,571 B2 | 2/2008 | Li |
| 7,617,031 B2 | 11/2009 | Li |
| 7,641,181 B2* | 1/2010 | Delorenzis .................. 267/64.13 |
| 2011/0079969 A1* | 4/2011 | Amlie et al. ............... 280/6.159 |
| 2012/0153581 A1 | 6/2012 | Li |

FOREIGN PATENT DOCUMENTS

| DE | 3620843 A1 | 12/1987 |
| DE | 19627894 C2 | 1/1998 |
| DE | 10125204 B4 | 1/2002 |

OTHER PUBLICATIONS

German Office Action dated Jan. 27, 2012 for German Patent Application 102010048252.8, corresponding to U.S. Appl. No. 12/580,281.

German Office Action dated Oct. 23, 2012 for German Patent Application 102010048252.8, corresponding to U.S. Appl. No. 12/580,281.

* cited by examiner

*Primary Examiner* — Thomas Tarcza
*Assistant Examiner* — Edward Pipala

(57) ABSTRACT

A method for temperature compensating an air spring of an air spring suspension of a motor vehicle after engine shut-off. A desired trim height is obtained. At engine shut-off, the ambient temperature is measured and the temperature of air in the air spring determined. After a wait time (for loading/unloading), a start trim height is measured. A predicted trim height is determined for when the air in the air spring is at the ambient temperature. Finally, the volume of the air in the air spring is selectively adjusted so that when the air in the air spring arrives at the ambient temperature, the trim height will be about the desired trim height.

14 Claims, 6 Drawing Sheets

TEMPERATURE COMPENSATION METHOD FOR AN AIR SUSPENSION AFTER ENGINE SHUT-OFF

TECHNICAL FIELD

The present invention relates generally to motor vehicle air suspension systems, and more particularly to the compressed air leveling devices thereof. Still more particularly, the present invention relates to a method for adjusting the location of the sprung mass to the unsprung mass (trim height) responsive to a prediction of temperature change after engine shut-off.

BACKGROUND OF THE INVENTION

Motor vehicle air suspension systems utilize compressed air operated leveling devices, as for example air springs and/or air spring over shock absorber modules or a combination thereof, to provide ride and leveling control of the vehicle. Such air suspension systems utilize an air compressor to provide a source of compressed air to the air operated leveling devices. In a typical configuration, as for example described in any of U.S. Pat. Nos. 4,829,436, 5,465,209, and 6,698,778, the air compressor is selectively connected by electronically controlled solenoid valves to the air operated leveling devices, a compressed air reservoir (optional), an air intake, and an air exhaust. Most air suspension systems operate in an "open state" in the sense the excess air volume within the system is vented to the atmosphere at the exhaust and the source air for the compressor is drawn from the atmosphere at the intake; however, at least one air suspension system (see above cited U.S. Pat. No. 6,698,778) operates in a "closed state" in the sense that air is not exchanged with the atmosphere, wherein excess air volume is stored in an air reservoir and the source air for the compressor is either the air reservoir or the air springs.

Figure 1:
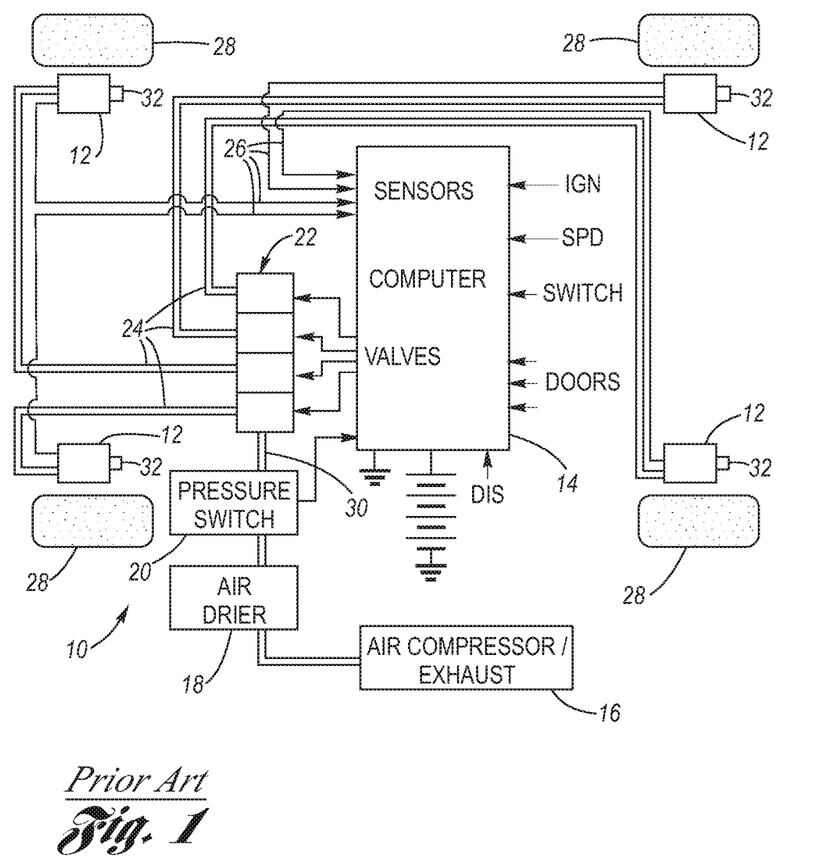
FIG. 1 is a schematic diagram of a prior art motor vehicle air suspension system.

Turning attention now to FIG. 1, an example of a prior art motor vehicle suspension system 10 is depicted, as generally also shown and described in aforementioned U.S. Pat. No. 4,829,436 to Kowalik et al, issued on May 9, 1989, the disclosure of which is hereby incorporated herein by reference.

The motor vehicle air suspension system 10 includes four compressed air operated leveling devices 12 which may be air springs and/or air spring over shock absorber modules, or a combination thereof, a computer 14, a compressor/exhaust apparatus 16, an air drier 18, a pressure switch 20, a valve assembly 22, a plurality of air lines 24 and signal lines 26. The plurality of air lines 24 go to the four leveling devices 12 to provide pressurized air from the valve assembly 22. A road wheel 28 is associated with each leveling device 12. The computer 14 receives an ignition signal, vehicle speed signal and vehicle door disposition signal. The computer 14 controls the operation of each solenoid valve in the valve assembly 22. The computer 14 also receives input from four position sensors 32, one at each of the four road wheels 28 through the four signal lines 26. The compressor/exhaust apparatus 16 selectively sources or vents air through the air drier 18. A master air line 30 runs from the pressure switch 20 to the valve assembly 22 which controls compressed air communication between the compressor/exhaust apparatus 16 and the individual leveling devices 12 in response to signals from the computer 14. The pressure switch 20 is optional, and is used to monitor the air pressure at each air leveling device 12.

When the engine of the motor vehicle is shut-off, the temperature within the air springs may be considerably higher than the ambient temperature, additionally, the vehicle may be loaded or unloaded shortly after the engine shut-off event (as for example presumed to have concluded within about 30 minutes, or so). As a result of these conditions, the location of the sprung mass (i.e., the vehicle body) relative to the location of the unsprung mass (i.e., the wheel), referred to herein as "trim height", may vary when the temperature in the air springs has arrived at equilibrium with the ambient air temperature.

Accordingly, what is needed in the prior art is some methodology to predict whether an undesirable vehicle height may occur after engine shut-off and provide execution of a remedy therefor if the prediction so warrants.

SUMMARY OF THE INVENTION

The present invention is a methodology to predict whether, in a motor vehicle equipped with air suspension, an undesirable trim height may occur after engine shut-off and provide execution of a remedy therefor if the prediction so warrants.

According to a preferred form of the air springs temperature compensation algorithm according to the present invention, the following steps are performed.

A desired trim height, $h_d$, is predetermined, as for example empirically, for a particular motor vehicle model.

At engine shut off, at a time $t_1$, the temperature of each of the air springs (an air spring being disposed at each wheel corner of the four wheel corners of the vehicle) is determined. This temperature determination may be either sensor based or is calculated through a prediction algorithm based upon sensed driving conditions of the motor vehicle before engine shut-off.

After a predetermined period of time, $\Delta t$, following engine shut-off, at a time $t_2$, (i.e., $t_1 + \Delta t = t_2$), the ambient air temperature, $T_a$, is measured via a temperature sensor, and a start trim height, $h_S$, is measured, respectively, via a position sensor for each wheel corner of the four wheel corners of the vehicle. In this regard, the wait time, $\Delta t$, is a preselected time in which loading/unloading of the vehicle is assumed to have been accomplished, as for nonlimiting example about 30 minutes, wherein the engine shut-off trim height at time $t_1$ is irrelevant.

Next, a predicted trim height, $h_p$, is made at each of the wheel corners for when the air in the air springs will arrive at the ambient air temperature, at a time $t_3$, based upon the start trim height, $h_S$, measured ambient temperature and the determined temperature of the air in the air springs at time $t_1$, wherein the prediction is based upon, for example, the ideal gas law under isobaric conditions.

Next, a target trim height, $h_t$, is determined for the air spring at each wheel corner, respectively, as for example based upon the ideal gas law under isobaric conditions, such that when the temperature of each respective air spring arrives at ambient temperature, $T_a$, the trim height will be about the desired trim height, $h_d$.

Finally, if the difference in trim heights as between the predicted trim height, $h_p$, and the desired trim height, $h_d$, is larger than a predetermined minimum trim height difference for each wheel corner, respectively, then, at each wheel corner, respectively, either: 1) air in the respective air spring is added to provide increased air spring volume (at generally constant pressure), and consequently, an increased trim height to the target trim height, $h_t$, or 2) air in the respective air spring is removed to provide decreased air spring volume (at generally constant pressure), and consequently, a decreased trim height to the target trim height, $h_t$. The predetermined minimum trim height difference could be different for different ambient temperature ranges, such as summer from 20° C. to 40° C., or winter from −40° C. to 5° C., etc.

Accordingly, it is an object of the present invention to provide a methodology to predict whether, in a motor vehicle equipped with an air suspension, an undesirable vehicle height may occur after engine shut off and provide execution of a remedy therefor if the prediction so warrants.

DESCRIPTION OF THE PREFERRED EMBODIMENT

Referring now to FIGS. 2 through 9E, various aspects of an air springs temperature compensation algorithm according to the present invention.

As mentioned above, when the engine of the motor vehicle is shut-off, the temperature within the air springs may be considerably higher than the ambient temperature, additionally, the vehicle may be loaded or unloaded shortly after the engine shut-off event (as for example presumed to have concluded within about 30 minutes, or so). As a result of these conditions, the trim height may vary when the temperature in the air springs has arrived at equilibrium with the ambient air temperature. The purpose of the present invention is to provide a methodology in which a future prediction is made of the air volume within each individual air spring when cooled to ambient temperature correlated to a measured trim height at the time of prediction, wherein the prediction includes a predicted trim height, which, if determined to be inappropriate, is adjusted by altering the volume within that air spring.

Figure 2:
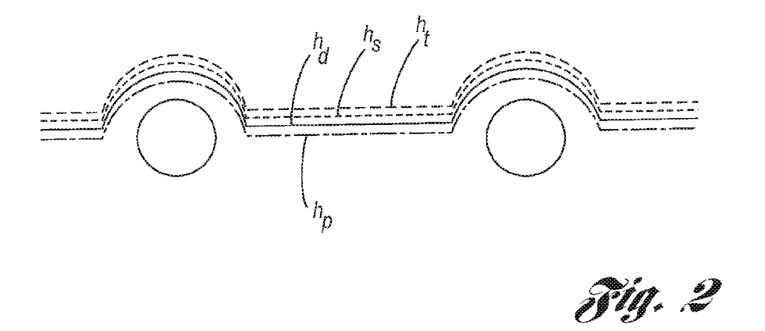
FIG. 2 is a schematic representation of a motor vehicle, indicating an exemplification of how trim height temperature compensation adjustment of air springs is effected according to the method of the present invention.

An example of change in trim height after engine shut-off is schematically shown at FIG. 2 (see also FIG. 9A), where the sprung mass is represented by lines and the unsprung mass is represented by circles, wherein the front of the vehicle is at the left side of the view. A desired trim height (DTH) is predetermined for the vehicle and is designated as $h_d$. After a predetermined wait time, $\Delta t$, since engine shut-off at $t_1$, which wait time allows for vehicle loading/unloading, at a time $t_2$ where $t_2=t_1+\Delta t$, the start trim height is measured as $h_s$, which, in this example is higher than $h_d$, as for example due to a high temperature, $T_s$, of the air in the air springs above ambient temperature, $T_a$, that is, $T_s \gg T_a$, and/or due to cargo unloading. After an extended parking period, a time $t_3$, the air in the air springs will arrive at ambient temperature and the trim height will change, which trim height change is predictable by, for example, the ideal gas law, and is designated as predicted trim height, $h_p$. The predicted trim height $h_p$ at $T_a$ is below $h_d$ and the difference between $h_p$ and $h_d$ is larger than a predetermined minimum trim height difference, air is added to the air spring at time $t_2$ to raise the trim height to a target trim height, $h_t$, such that when the air in the air spring arrives at ambient temperature, $T_a$, at time $t_3$, then the trim height will be the DTH, $h_d$. For other non-limiting scenarios, see FIGS. 9B through 9C.

Figure 3:
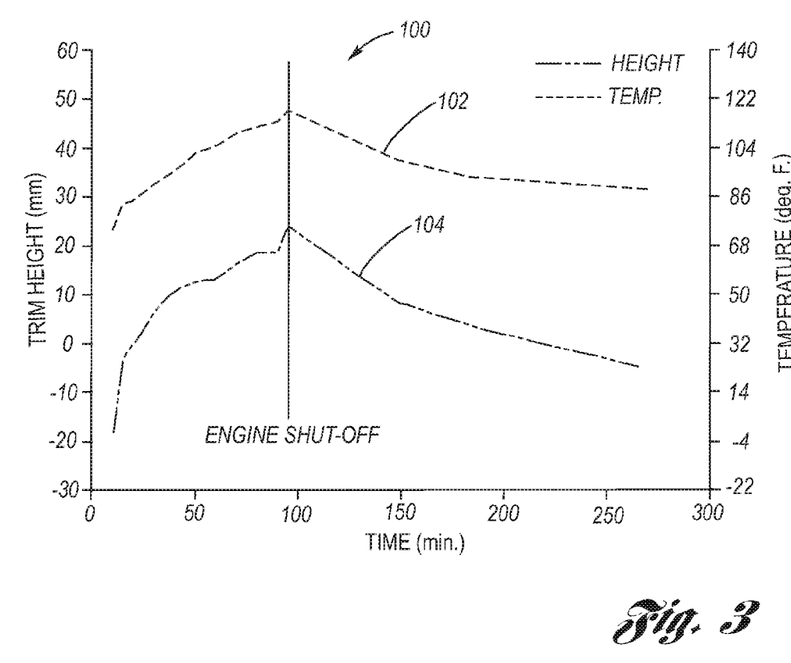
FIG. 3 is a graph representing trim heights and air spring air temperatures for various driving conditions of a motor vehicle.

FIG. 3 is a graph 100 showing how the trim height can vary as temperature of the air in the air springs varies during a test (automatic trim leveling was disabled). Plot 102 represents the measured air temperature of an air spring which is part of an air spring over shock absorber module. The air spring air temperature increases with shock absorber temperature because of the damping forces generated to improve vehicle ride and handling in response to road inputs, and decreases as it is cools to ambient temperature after engine shut-off. Plot 104 represents the vehicle trim height changes due to air spring temperature changes.

Figure 4:
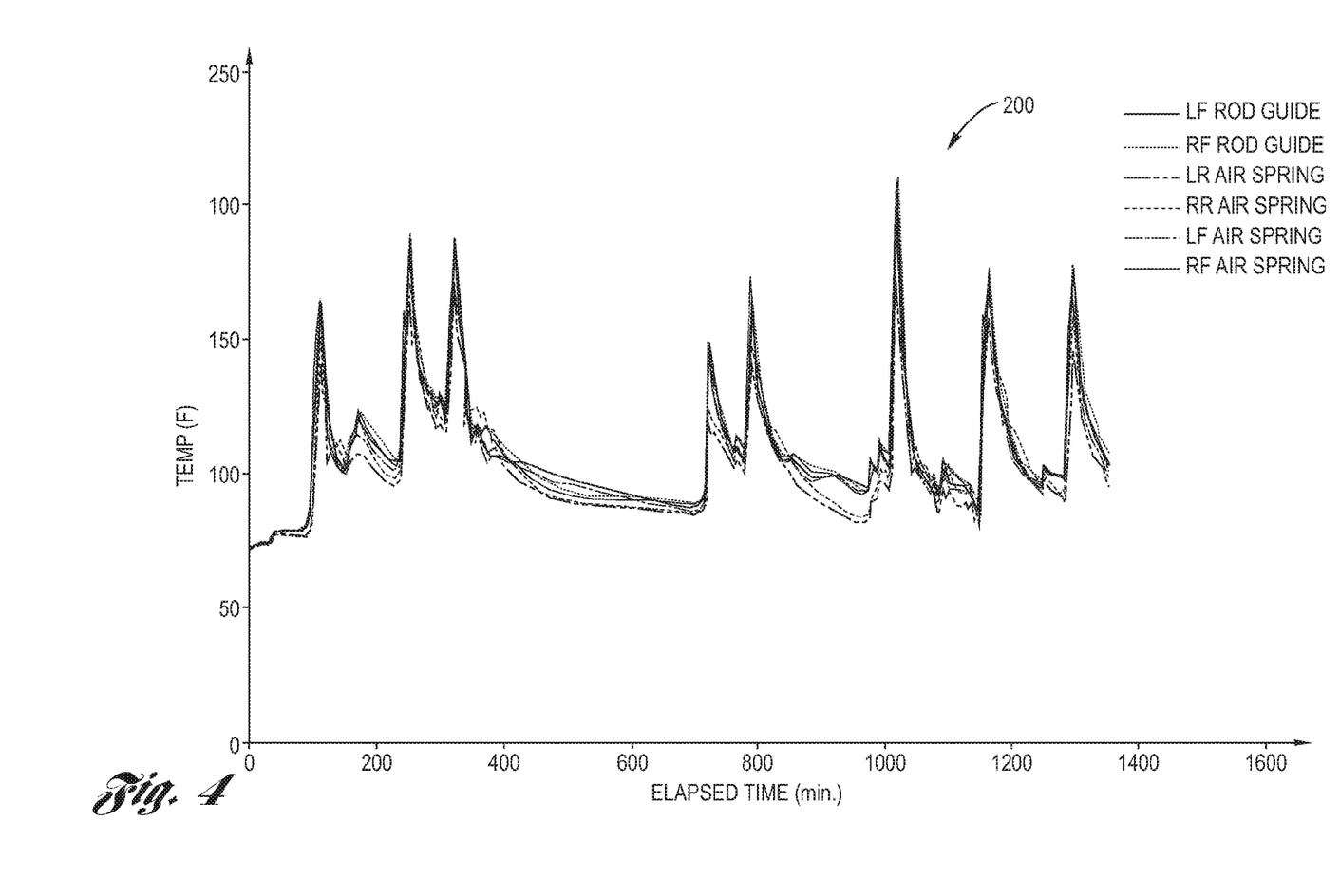
FIG. 4 is a graph representing shock absorber temperatures for various driving conditions of a motor vehicle.

FIG. 4 is a graph 200 showing how the temperature of the shock absorbers (dampers) can vary during a driving test encountering various road conditions. The plots representations are for the various indicated components as labeled, wherein maximum excursion capability is 212 degrees F., and the maximum continuous capability is 168 degrees F. The temperature behavior of the damper is important relative to the present invention from the standpoint of the proximity of the damper to the air spring, and therefore its contribution to its heating, as for particular example configurations in which the air spring is disposed over the damper.

Figure 5A:
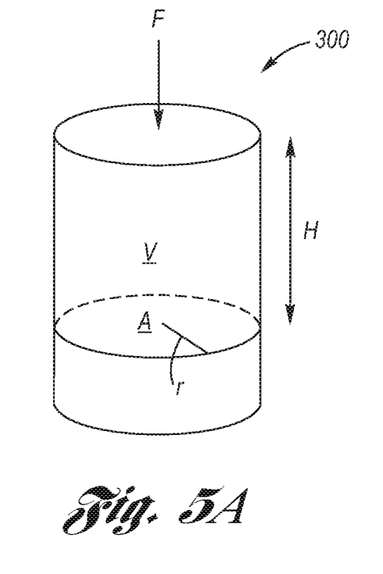
FIG. 5A is a schematic representation of an air spring.

FIG. 5A is a schematic representation of an air spring 300, in which the area A and radius r thereof are constant, but the height H may change, wherein the volume V is given by $V=\pi r^2 H$. The sprung mass acting on the air spring 300 provides a force F, which is constant (for a parked vehicle). The ideal gas law written as, $PV=nRT$, is the equation of state of an ideal gas, wherein P is pressure, V is volume, n is mass in moles, and R is a "gas" constant. In that the area, A, of the air springs and the force, F, of the sprung mass are constants, the ideal gas law as applied to air springs may be considered isobaric processes.

Figure 5B:
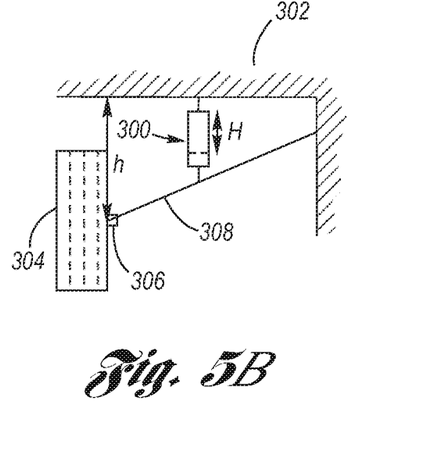
FIG. 5B is a schematic representation of a wheel corner of a motor vehicle.

FIG. 5B is a schematic representation of a wheel corner including a pivotable suspension 308 between the wheel (unsprung mass) 304 and the vehicle body (sprung mass) 302, and a trim position sensor 306, wherein a distance h is the trim height as between the sprung and unsprung masses, and H is defined in FIG. 5A with respect to the air spring 300. A predetermined ratio, $R_a$, is determined, such that $H=R_a h$, wherein for a non-limiting example, $R_a=0.625$.

Figure 6:
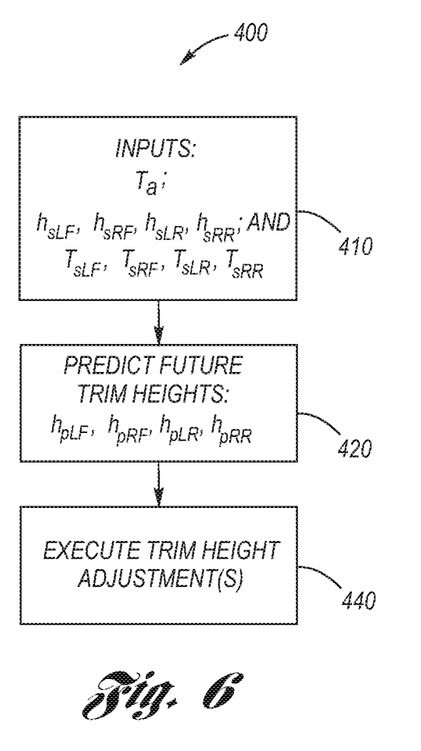
FIG. 6 is an over all algorithm for executing the air springs temperature compensation algorithm according to the present invention.

FIG. 6 is an algorithm 400 which summarizes the air spring temperature compensation method according to the present invention.

At Block 410, a computer, such as computer 14, has input after engine shut-off, at a time $t_1$, the ambient air temperature, $T_a$, and further input after a wait time in which loading/unloading of the vehicle is assumed completed, i.e., about 30 minutes, at a time $t_2$, are "start" trim heights at each wheel corner: $h_{sLF}$, $h_{sRF}$, $h_{sLR}$ and $h_{sRR}$, as well as the temperature (sensed or calculated, as for example per algorithm 500 of FIG. 7) of the air spring at each of the wheel corners, $T_{sLF}$, $T_{sRF}$, $T_{sLR}$ and $T_{sRR}$.

At Block 420, a "predicted" trim height, $h_p$, is determined for each of the wheel corners based upon the assumption the air in the respective air springs will cool to $T_a$, in a certain period of time, $t_3$, (as for non-limiting example an extend parking time). For example, using the ideal gas law and assuming isobaric conditions, at the left-front air spring, LF: $P = nRT_{sLF}/V_{sLF} = nRT_a/V_{pLF}$, $T_{sLF}/V_{sLF} = T_a/V_{pLF}$, and since V=HA, where the area, A, is constant, $H_{pLF}$ is given by $H_{pLF} = T_a(H_{sLF}/T_{sLF})$. The height H is related to the trim height h sensed by the position sensor (306 in FIG. 5B) by a predetermined ratio, $R_a$, where $H = R_a h$. Accordingly, $R_a h_{pLF} = T_a(R_a h_{sLF}/T_{sLF})$, and $h_{pLF} = T_a(h_{sLF}/T_{sLF})$. Similar predictions are made for each of the air springs, RF, LR and RR of the other wheel corners.

Finally, at Block 440, a trim height adjustment to a target trim height $h_t$ is made so that when the temperature in the respective air springs cools to $T_a$, the trim height will be substantially the desired trim height (DTH), $h_{dLF}$, $h_{dRF}$, $h_{dLR}$, and $h_{dRR}$, wherein the adjustment is preferably made only if the difference between the respective predicted trim heights is greater than a predetermined difference with respect to the respective desired trim heights. For example, using the ideal gas law and assuming isobaric conditions, at the left-front air spring, LF: $P = (n$ plus or minus $\Delta n) RT_{LF}/V_{tLF} = (n$ plus or minus $\Delta n) RT_a/V_{dLF}$, $T_{sLF}/V_{tLF} = T_a/V_{dLF}$, and since V=HA, where the area, A, is constant, $H_{tLF}$ is given by $H_{tLF} = T_{sLF}(H_{dLF}/T_a)$. The height H is related to the trim height h sensed by the position sensor (306 in FIG. 5B) by a predetermined ratio, $R_a$, where $H = R_a h$. Accordingly, $R_a h_{tLF} = T_{sLF}(R_a h_{dLF}/T_a)$, and, $h_{tLF} = T_{sLF}(h_{dLF}/T_a)$. Similar predictions are made for each of the air springs, RF, LR and RR of the other wheel corners.

It is to be understood that the air springs temperature compensation method according to the present invention may use other than the ideal gas law, the utilized gas law being applicable to the air within the air springs. Additionally, the air suspension including the air springs may be of the open state or closed state configuration, wherein to provide air to the air springs a compressor or air tank supplies the air, and to remove air from the air springs, the air in the air springs may be pumped to an air tank or vented to atmosphere.

Figure 7:
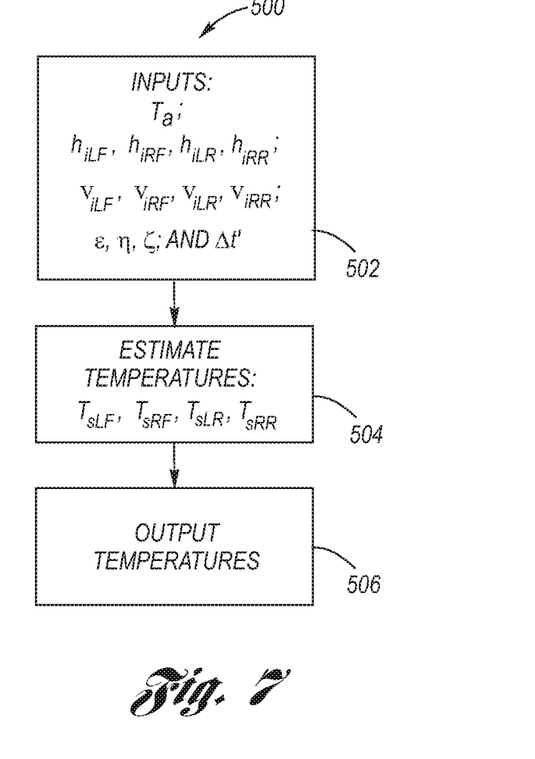
FIG. 7 is an algorithm for estimating the temperature of the air within the air springs in accordance with the methodology of the present invention.

FIG. 7 is an algorithm 500 for estimating the temperature of the air within the air springs in accordance with the methodology of the present invention.

After engine turn-on at Block 502, a computer, such as computer 14, has as input, the ambient air temperature, $T_a$, initial trim heights at each wheel corner: $h_{iLF}$, $h_{iRF}$, $h_{iLR}$ and $h_{iRR}$, a predetermined sampling time $\Delta t'$, predetermined air spring heat transfer coefficients at each wheel corner $\epsilon_{LF}$, $\epsilon_{RF}$, $\epsilon_{LR}$, $\epsilon_{RR}$, and predetermined air spring friction constants at each wheel corner $\eta_{LF}$, $\eta_{RF}$, $\eta_{LR}$, $\eta_{RR}$. If the air spring is disposed over a damper, predetermined damper heat dissipation coefficients, $\varsigma LF_{LF}$, $\varsigma LF_{RF}$, $\varsigma LF_{LR}$, $\varsigma LF_{RR}$, would apply, respectively, as would initial damper velocities, $v_{iLF}$, $v_{iRF}$, $v_{iLR}$ and $v_{iRR}$, respectively, and be available as inputs to the computer 14 through measurements or calculations by techniques well known in the art. Damper velocity v is related to position sensor velocity $v_p$ (i.e., $v_p$ is the first derivative of position sensor output with respect to time) as $v = R_a v_p$.

At Block 504 air spring temperatures at each wheel corner $T_{LF}$, $T_{RF}$, $T_{LR}$ and $T_{RR}$ are estimated after every predetermined sampling time $\Delta t'$ from engine turn-on until engine turn-off. At engine turn-off, the air spring temperatures at each wheel corner $T_{LF}$, $T_{RF}$, $T_{LR}$ and $T_{RR}$ are stored, for example in computer 14, for availability as output temperatures at Block 506 for subsequent use at Block 410 of FIG. 6.

If the air spring is not disposed over a damper, the air spring temperature at each wheel corner is estimated after every predetermined sampling time $\Delta t'$ from engine turn-on until engine turn-off from:

$$T_k = T_{k-1} + \epsilon(T_a - T_{k-1})\Delta t' + \eta |h_k - h_{k-1}|. \tag{1}$$

Initially, at engine turn-on, the trim height is measured at each corner and the ambient temperature is measured. After a predetermined sampling time $\Delta t'$, k=1, $T_{k-1} = T_0 = T_a$ where $T_0$ is the ambient temperature measured at engine turn-on, $h_{k-1} = h_0$ where $h_0$ is the trim height measured at each corner at engine turn-on, and $h_k = h_1$ is the trim height measured at each corner. $T_k = T_1$ can now be calculated from equation (1). The use of equation (1) to provide subsequent values of $T_k$ are well know in the art.

If the air spring is disposed over a damper, the air spring temperature at each wheel corner is estimated after every predetermined sampling time $\Delta t'$ from engine turn-on until engine turn-off from:

$$T_k = T_{k-1} + \epsilon(T_a - T_{k-1})\Delta t' + \eta |h_k - h_{k-1}| + \varsigma LF\, v_k^2 \Delta t'. \tag{2}$$

Initially, at engine turn-on, the trim height is measured at each corner and the ambient temperature is measured. After a predetermined sampling time $\Delta t'$, k=1, $T_{k-1} = T_0 = T_a$ where $T_0$ is the ambient temperature measured at engine turn-on, $h_{k-1} = h_0$ where $h_0$ is the trim height measured at each corner at engine turn-on, and $h_k = h_1$ is the trim height measured at each corner. $T_k = T_1$ can now be calculated from equation (2). The damper velocity $v_k = v_1$, and $T_1$ can now be calculated from equation (2). The use of equation (2) to provide subsequent values of $T_k$ are well know in the art.

Figure 8:
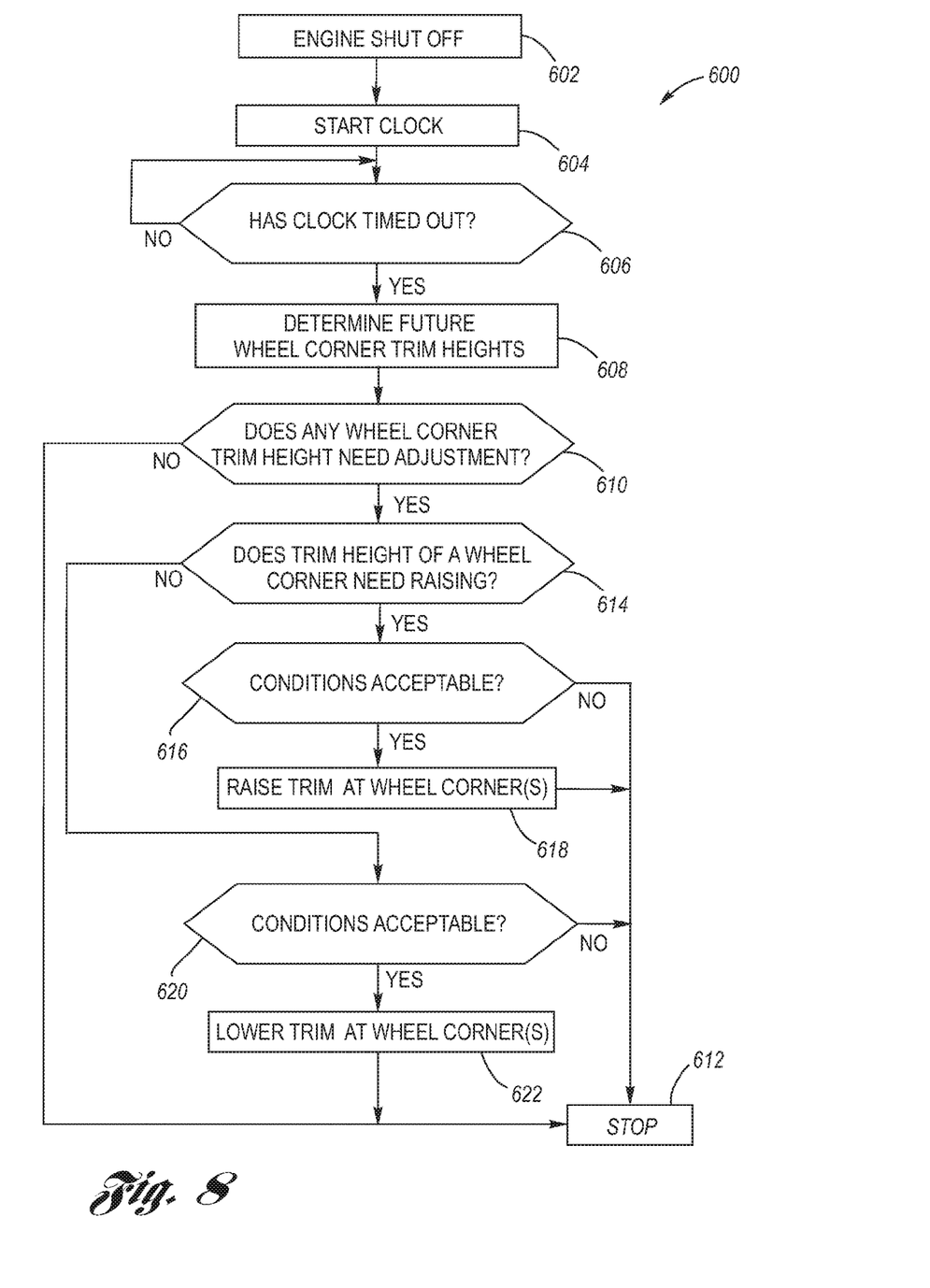
FIG. 8 is a detail algorithm for executing the air springs temperature compensation algorithm according to the present invention.

FIG. 8 is a detail algorithm 600 for executing the air springs temperature compensation algorithm according to the present invention.

Algorithm 600 starts at Block 602 when the engine is shut-off at time $t_1$. At Block 602, the temperature of the air in each air spring is obtained (by measurement or by algorithm 500), the start trim height $h_s$ at each wheel corner is measured by a position sensor, and the ambient temperature is measured. Control then passes to Block 604 whereat a clock is started for the measurement of the wait time $\Delta t$, which expires at time $t_2$. The wait time is intended as a time during which loading and unloading of the vehicle occurs, as for a non-limiting example, 30 minutes. Inquiry is made at Decision Block 606 whether the wait time has elapsed, wherein when the answer to the inquiry is yes, then control passes to Block 608. At Block 608, a predicted trim height, $h_p$, and a target trim height, $h_t$, are determined for each wheel corner, as discussed hereinabove with respect to FIG. 6, and control passes to Decision Block 610. At Decision Block 610, inquiry is made whether the difference between the respective predicted trim heights, $t_p$, is greater than a predetermined difference with respect to the respective desired trim heights, $t_d$, at each wheel corner, then control passes to Decision Block 614, otherwise, control passes to Block 612 whereat the algorithm ends. It is to be understood that for purposes of execution of Decision Block 610, a predetermined minimum trim height difference between the start trim height, $h_s$, and the target trim height, $h_t$, could be synonymously used.

At Decision Block 614, inquiry is made whether the target trim height is higher than the start trim height, wherein if the answer to the inquiry is yes, then control passes to Decision Block 616, otherwise control passes to Decision Block 620. At Decision Block 616 inquiry is made whether conditions favor raising the trim height at the respective air spring. For example, whether the vehicle battery is sufficiently charged to effect air input to the respective air spring, whether air reservoir has enough air volume/pressure to input to air spring, whether the ambient temperature change rate favors doing nothing (as measured at each of $t_1$ and $t_2$), or whether the trim height is already quite high, wherein if the answer is no, then control passes to Block 612. However, if the answer to the inquiry is yes, then control passes to Block 618, whereat air is input to the respective air spring(s) is effected to raise the respective trim height to the respective target trim height, which may be determined, for example, from a signal from the position sensor thereat, and control then passes to Block 612. Otherwise, at Decision Block 620, inquiry is made whether conditions favor lowering the trim height at the respective air spring. For example, whether the vehicle battery is sufficiently charged to effect air output from the respective air spring, whether air reservoir has enough air volume/pressure to input to air spring, whether the ambient temperature change rate favors doing nothing (as measured at each of $t_1$ and $t_2$), or whether the vehicle trim height is already quite low, wherein if the answer is no, then control passes to Block 612. However, if the answer to the inquiry is yes, then control passes to Block 622, whereat air is output from the respective air spring(s) is effected to lower the respective trim height to the respective target trim height, which may be determined, for example, from a signal from the position sensor thereat, and then control passes to Block 612.

Turning attention now to FIGS. 9A through 9D, various scenarios are presented in which the air spring temperature compensation method has been implemented, wherein the example is generically applicable to any of the air springs, LR, RF, LR, RR.

Figure 9A:
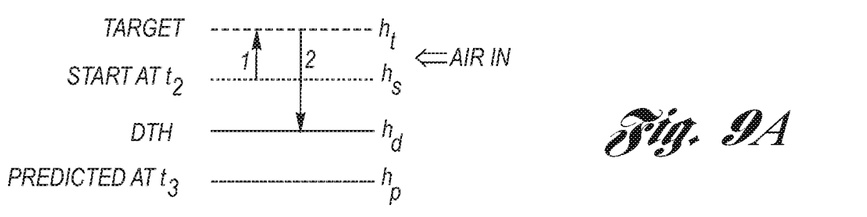
FIGS. 9A through 9E are exemplifications of how and whether trim height temperature compensation adjustments of air springs are effected according to the method of the present invention.

At FIG. 9A (see also FIG. 2), after a wait time since engine shut-off, at time $t_2$, the start trim height is $h_s$, which is higher than the desired trim height (DTH), $h_d$, (as for example due to the high temperature of the air in the air springs and/or cargo unloading). The predicted trim height $h_p$ at $T_a$ is below $h_d$, and since the difference between $h_p$ and $h_d$ is larger than the predetermined minimum trim height difference, air is added to the air spring to raise the trim height to a target trim height, $h_t$, (see arrow 1), wherein upon reaching $T_a$, the trim height will be the DTH, $h_d$, (see arrow 2).

Figure 9B:
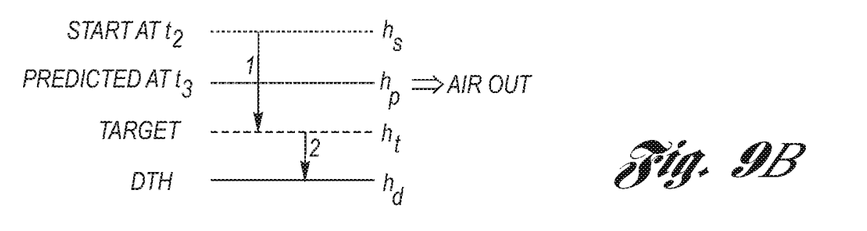

At FIG. 9B, after a wait time since engine shut-off, at time $t_2$, the start trim height is $h_s$, which is higher than the desired trim height (DTH), $h_d$, (as for example due to cargo unloading). The predicted trim height $h_p$ at $T_a$ is above $h_d$, and since the difference between $h_p$ and $h_d$ is larger than the predetermined minimum trim height difference, air is removed from the air spring to lower the trim height to a target trim height, $h_t$, (see arrow 1), wherein upon reaching $T_a$, the trim height will be the DTH, $h_d$, (see arrow 2).

Figure 9C:
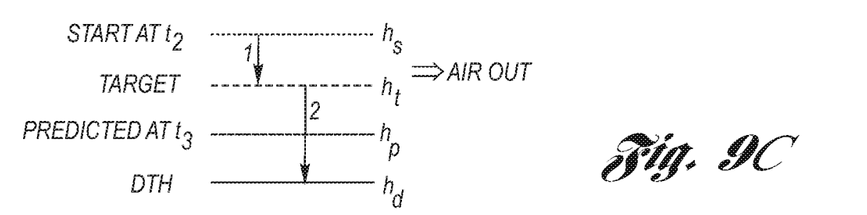

At FIG. 9C, after a wait time since engine shut-off, at time $t_2$, the start trim height is $h_s$, which is higher than the desired trim height (DTH), $h_d$, (as for example due to cargo unloading). The predicted trim height $h_p$ at $T_a$ is above $h_d$, and since the difference between $h_p$ and $h_d$ is larger than the predetermined minimum trim height difference, air is removed from the air spring to lower the trim height to a target trim height, $h_t$, (see arrow 1), wherein upon reaching $T_a$, the trim height will be the DTH, $h_d$, (see arrow 2).

Figure 9D:
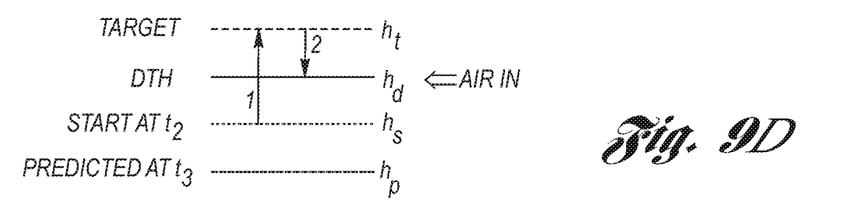

At FIG. 9D, after a wait time since engine shut-off, at time $t_2$, the start trim height is $h_s$, which is lower than the desired trim height (DTH), $h_d$, (as for example due to cargo loading). The predicted trim height $h_p$ at $T_a$ is below $h_d$, and since the difference between $h_p$ and $h_d$ is larger than the predetermined minimum trim height difference, air is introduced into the air spring to raise the trim height to a target trim height, $h_t$, (see arrow 1), wherein upon reaching $T_a$, the trim height will be the DTH, $h_d$, (see arrow 2).

Figure 9E:
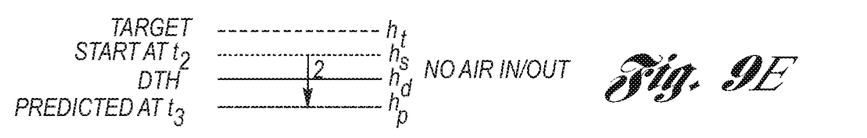

At FIG. 9E, after a wait time since engine shut-off, at time $t_2$, the start trim height is $h_s$, which is higher than the desired trim height (DTH), $h_d$, (as for example due to the high temperature of the air in the air springs and/or cargo unloading). The predicted trim height $h_p$ at $T_a$ is below $h_d$, but the difference between $h_p$ and $h_d$ (or the difference between $h_s$ and $h_t$) is smaller than the predetermined minimum trim height difference. Accordingly, no air is added to the air spring, and its trim height is allowed to stay at $h_s$ at time $t_2$. The trim height will fall to $h_p$ as the temperature of the air in the air spring goes to $T_a$ (see arrow 2). By way of non-limiting exemplification, a predetermined minimum trim height difference could be 2 mm.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A method for temperature compensating an air spring of an air spring suspension of a motor vehicle after engine shut-off, comprising the steps of:
    obtaining a desired trim height;
    shutting off the engine;
    measuring ambient temperature;
    determining temperature of air in the air spring;
    measuring a start trim height at a predetermined time after the engine shut-off;
    determining after the engine shut-off, via a dedicated computer, a predicted trim height for when the air in the air spring will be at the ambient temperature responsive to said steps of measuring and said step of determining temperature; and
    selectively adjusting after the engine shut-off, via said dedicated computer, volume of the air in the air spring to thereby provide a target trim height such that when the temperature of the air spring is at the ambient temperature, the trim height will be substantially the desired trim height;
    wherein said step of selectively adjusting is responsive to said step of determining a predicted trim height; and
    wherein said step of selectively adjusting is performed if the predicted trim height at that respective wheel corner is different from the desired trim height by at least a predetermined minimum trim height difference.

2. A method for temperature compensating an air spring of an air spring suspension of a motor vehicle after engine shut-off, comprising the steps of:
    obtaining a desired trim height;
    shutting off the engine;
    measuring ambient temperature;
    determining temperature of air in the air spring;
    measuring a start trim height at a predetermined time after the engine shut-off;
    determining after the engine shut-off, via a dedicated computer, a predicted trim height for when the air in the air spring will be at the ambient temperature responsive to said steps of measuring and said step of determining temperature; and
    selectively adjusting after the engine shut off, via said dedicated computer, volume of the air in the air spring responsive to said step of determining a predicted trim height to thereby provide a target trim height such that when the temperature of the air spring is at the ambient temperature, the trim height will be substantially the desired trim height.

3. The method of claim 2, wherein said step of selectively adjusting is performed if the predicted trim height is different from the desired trim height by at least a predetermined minimum trim height difference.

4. The method of claim 3, wherein the predetermined time is a wait time for allowing loading and unloading of the motor vehicle to presumably complete.

5. The method of claim 4, wherein said step of selectively adjusting comprises:
  adding air to the air spring if said step of predicting predicts the predicted trim height will be below the desired trim height; and
  removing air in the air spring if said step of predicting predicts the predicted trim height will be above the desired trim height.

6. The method of claim 5, wherein said steps of determining a predicted trim height and selectively adjusting volume of the air in the air spring responsive to said step of predicting to thereby provide a target trim height are performed utilizing a predetermined gas law applicable to the air in the air spring.

7. The method of claim 5, wherein said step of determining the temperature of the air in the air spring comprises an algorithmic estimation of the component temperature responsive to a stored memory of driving conditions prior to the engine shut-off.

8. The method of claim 7, wherein said steps of determining a predicted trim height and selectively adjusting volume of the air in the air spring responsive to said step of predicting to thereby provide a target trim height are performed utilizing a predetermined gas law applicable to the air in the air spring.

9. A method for temperature compensating each air spring at each wheel corner of an air spring suspension of a motor vehicle after engine shut-off, comprising the steps of:
  obtaining a desired trim height;
  shutting off the engine;
  measuring ambient temperature;
  determining temperature of air in the air spring at each of the wheel corners, respectively;
  measuring a start trim height at a predetermined time after the engine shut-off at each of the wheel corners, respectively;
  determining after the engine shut-off, via a dedicated computer, a predicted trim height at each wheel corner for when the air in each respective air spring will be at the ambient temperature, respectively, responsive to said steps of measuring and said step of determining temperature; and
  selectively adjusting after the engine shut-off, via said dedicated computer, volume of the air in each respective air spring responsive to said step of predicting to thereby provide a target trim height at each wheel corner, respectively, such that when the temperature of each respective air spring is at the ambient temperature, the trim height at that respective wheel corner will be substantially the desired trim height;
  wherein said step of selectively adjusting is performed if the predicted trim height at that respective wheel corner is different from the desired trim height by at least a predetermined minimum trim height difference.

10. The method of claim 9, wherein the predetermined time is a wait time for allowing loading and unloading of the motor vehicle to presumably complete.

11. The method of claim 10, wherein said step of selectively adjusting comprises:
  adding air to a respective air spring if said step of predicting predicts the predicted trim height at that respective wheel corner will be below the desired trim height; and
  removing air in a respective air spring if said step of predicting predicts the predicted trim height at that respective wheel corner will be above the desired trim height.

12. The method of claim 11, wherein said steps of determining a predicted trim height and selectively adjusting volume of the air in the air spring responsive to said step of predicting to thereby provide a target trim height are performed utilizing a predetermined gas law applicable to the air in the air spring.

13. The method of claim 11, wherein said step of determining the temperature of the air in each respective air spring comprises an algorithmic estimation of the component temperature responsive to a stored memory of driving conditions at each respective wheel corner prior to the engine shut-off.

14. The method of claim 13, wherein said steps of determining a predicted trim height and selectively adjusting volume of the air in the air spring responsive to said step of predicting to thereby provide a target trim height are performed utilizing a predetermined gas law applicable to the air in the air spring.

* * * * *